US009990116B2

(12) United States Patent
Halbedel

(10) Patent No.: US 9,990,116 B2
(45) Date of Patent: Jun. 5, 2018

(54) SYSTEMS AND METHODS FOR SELF-LEARNING DYNAMIC INTERFACES

(71) Applicant: SAP SE, Walldorf (DE)

(72) Inventor: Ralf Halbedel, Heidelberg (DE)

(73) Assignee: SAP SE, Walldorf (DE)

( * ) Notice: Subject to any disclaimer, the term of this patent is extended or adjusted under 35 U.S.C. 154(b) by 319 days.

(21) Appl. No.: 14/472,852

(22) Filed: Aug. 29, 2014

(65) Prior Publication Data

US 2016/0062603 A1  Mar. 3, 2016

(51) Int. Cl.
*G06F 3/0484* (2013.01)
*G06F 3/0482* (2013.01)
*G06N 5/02* (2006.01)
*G06N 99/00* (2010.01)
*G06F 9/44* (2018.01)

(52) U.S. Cl.
CPC ........ *G06F 3/04842* (2013.01); *G06F 3/0482* (2013.01); *G06F 9/4443* (2013.01); *G06N 5/02* (2013.01); *G06N 99/005* (2013.01)

(58) Field of Classification Search
CPC . G06F 17/30; G06F 17/3053; G06F 17/30864
USPC ....................................................... 715/762
See application file for complete search history.

(56) References Cited

U.S. PATENT DOCUMENTS

| | | | | |
|---|---|---|---|---|
| 7,756,887 | B1 * | 7/2010 | Haveliwala | G06F 17/30554 707/769 |
| 8,701,027 | B2 * | 4/2014 | van Dantzich | G06F 3/0482 715/768 |
| 8,898,091 | B2 * | 11/2014 | Frank | G06N 99/005 706/12 |
| 8,930,839 | B2 * | 1/2015 | He | G06F 3/04817 715/765 |
| 9,665,641 | B1 * | 5/2017 | Zhang | G06F 17/30657 |
| 2002/0129015 | A1 * | 9/2002 | Caudill | G06F 17/3069 |
| 2003/0172078 | A1 * | 9/2003 | Stumpf | G06F 17/30961 |
| 2004/0169688 | A1 * | 9/2004 | Burdick | G06F 3/0482 715/854 |
| 2005/0004813 | A1 * | 1/2005 | Gvelesiani | G06Q 10/10 715/804 |
| 2005/0005259 | A1 * | 1/2005 | Avery | G06F 9/5038 717/103 |
| 2005/0266884 | A1 * | 12/2005 | Marriott | H04L 51/066 455/558 |
| 2005/0273702 | A1 * | 12/2005 | Trabucco | G06F 17/3089 715/234 |
| 2007/0162485 | A1 * | 7/2007 | Haeberle | G06Q 10/10 |

(Continued)

*Primary Examiner* — Daeho D Song
(74) *Attorney, Agent, or Firm* — Jones Day

(57) ABSTRACT

A system and method for generating dynamic user interfaces that retrieve, at a backend UI server, one or more user requests originating from an information management application, retrieving, at the backend UI server, a data response originating from a data server in response to the one or more user requests, calculate, at the backend UI server, relevance values for each display component of the information management application, append the calculated relevance values to the data response, transmit the calculated relevance values and the data response to a frontend UI server; and generate, at the frontend UI server, a user interface for the information management application based on the calculated relevance values.

20 Claims, 5 Drawing Sheets

| Functions Menu 310 | Relevant Information Display 320 |
|---|---|
| Function 1 | Most Relevant Information 1 |
| | Most Relevant Information 2 |
| Function 2 | Related Items 330 |
| Function 3 | Project 1 |
| | Project 2 |
| | Project 3 |
| Expanded Functions Menu 311 | Expanded Information Display 331 |

300

(56) References Cited

U.S. PATENT DOCUMENTS

| | | | |
|---|---|---|---|
| 2007/0198314 A1* | 8/2007 | Andrew | G06Q 10/06316 705/7.19 |
| 2007/0288414 A1* | 12/2007 | Barajas | G06N 7/00 706/46 |
| 2008/0082920 A1* | 4/2008 | Eom | G06F 3/04886 715/702 |
| 2008/0255937 A1* | 10/2008 | Chang | G06Q 30/02 705/14.43 |
| 2009/0083314 A1* | 3/2009 | Maim | G06F 17/2211 |
| 2009/0187844 A1* | 7/2009 | Dugan | G06F 17/30884 715/771 |
| 2009/0216735 A1* | 8/2009 | Dexter | G06F 17/30011 |
| 2010/0062411 A1* | 3/2010 | Bartholomew | G09B 7/00 434/350 |
| 2010/0130179 A1* | 5/2010 | Colligan | G06Q 30/02 455/414.1 |
| 2010/0153885 A1* | 6/2010 | Yates | G06F 3/0482 715/841 |
| 2010/0162159 A1* | 6/2010 | Sudhi | G06F 9/4446 715/780 |
| 2010/0199219 A1* | 8/2010 | Poniatowski | G06F 3/0482 715/825 |
| 2010/0217841 A1* | 8/2010 | Schneider | G06F 15/177 709/220 |
| 2010/0262477 A1* | 10/2010 | Hillerbrand | G06Q 30/02 705/14.16 |
| 2010/0312382 A1* | 12/2010 | Ma | G06Q 20/123 700/236 |
| 2011/0153717 A1* | 6/2011 | Fitterer | G06F 17/30404 709/203 |
| 2011/0202542 A1* | 8/2011 | Phillips | G06Q 10/06 707/749 |
| 2011/0208753 A1* | 8/2011 | Sivadas | G06F 3/015 707/749 |
| 2011/0283226 A1* | 11/2011 | Basson | G06F 3/0481 715/794 |
| 2011/0313963 A1* | 12/2011 | Liu | G06Q 10/06 706/48 |
| 2012/0102410 A1* | 4/2012 | Gewecke | G06F 17/30029 715/738 |
| 2012/0150446 A1* | 6/2012 | Chang | G06Q 10/10 702/3 |
| 2012/0290289 A1* | 11/2012 | Manera | G06F 17/2785 704/9 |
| 2012/0311465 A1* | 12/2012 | Nealer | H04L 29/06 715/760 |
| 2013/0103680 A1* | 4/2013 | Arrasvuori | G06F 17/301 707/728 |
| 2013/0204838 A1* | 8/2013 | Gould | H04L 41/5041 707/609 |
| 2013/0227447 A1* | 8/2013 | Jun | G06F 3/01 715/762 |
| 2013/0275422 A1* | 10/2013 | Silber | G06F 17/30864 707/728 |
| 2014/0025673 A1* | 1/2014 | Sinha | G06Q 10/101 707/732 |
| 2014/0058835 A1* | 2/2014 | Yudashkin | G06F 17/30867 705/14.49 |
| 2014/0059141 A1* | 2/2014 | Belkin | H04L 51/12 709/206 |
| 2014/0067798 A1* | 3/2014 | Marum | G06F 17/30979 707/728 |
| 2014/0096014 A1* | 4/2014 | Johnson | H04L 41/22 715/733 |
| 2014/0129552 A1* | 5/2014 | Sinha | G06F 17/3053 707/724 |
| 2014/0156680 A1* | 6/2014 | Aravamudan | G06F 3/0481 707/749 |
| 2014/0179426 A1* | 6/2014 | Perry | A63F 13/10 463/31 |
| 2014/0181788 A1* | 6/2014 | Sullivan | G06F 8/38 717/109 |
| 2014/0207801 A1* | 7/2014 | Palmert | G06F 17/30867 707/749 |
| 2014/0280292 A1* | 9/2014 | Skinder | G06F 17/30448 707/767 |
| 2014/0280476 A1* | 9/2014 | Chiussi | H04L 67/10 709/203 |
| 2014/0359012 A1* | 12/2014 | Watanabe | H04L 65/403 709/204 |
| 2015/0020006 A1* | 1/2015 | Kotzer | G06F 17/30867 715/762 |
| 2015/0039360 A1* | 2/2015 | Gowdra | G06Q 10/0631 705/7.12 |
| 2015/0127637 A1* | 5/2015 | Cavanagh | G06F 17/3053 707/723 |
| 2015/0128049 A1* | 5/2015 | Block | G06F 3/1423 715/728 |
| 2015/0149462 A1* | 5/2015 | Biyani | G06F 17/30705 707/737 |
| 2015/0278212 A1* | 10/2015 | Krueppel-Berndt | G06F 17/3053 707/728 |
| 2015/0317320 A1* | 11/2015 | Miller | G06F 17/3053 707/728 |
| 2016/0117392 A1* | 4/2016 | Jing | G06F 17/30864 707/722 |

* cited by examiner

100

| Functions Menu 310 | Relevant Information Display 320 | | | | |
|---|---|---|---|---|---|
| Function 1 | Most Relevant Information 1 | | | | |
| Function 2 | Most Relevant Information 2 | | | | |
| Function 3 | | Related Items 330 | | | |
| | | Project 1 | | | |
| | | Project 2 | | | |
| | | Project 3 | | | |
| Expanded Functions Menu 311 | | | | | Expanded Information Display 331 |

FIG. 3
300

SYSTEMS AND METHODS FOR SELF-LEARNING DYNAMIC INTERFACES

FIELD OF INVENTION

The present invention relates to user interfaces of computer applications, and more particularly, to dynamic user interfaces that generate and render non-static interfaces based on user behavior.

BACKGROUND

In today's hyper information age, it is not uncommon to manage large amounts of electronically stored information. A variety of applications and application types have been developed to enable users to view, query, manipulate, and delete data stored at backend systems. For example, many existing applications have been developed to manage particular data objects such as databases, e-mail, calendars, tasks, etc.

Advances in computing technologies have enabled smaller devices, such as mobile phones and tablets, to execute more sophisticated functions and applications. As a result, people often utilize their mobile phones and tablets to perform many of the functions that they previously performed on their personal computers and laptops. For example, users now view websites, e-mail, and calendars on their mobile phones and tablets.

Despite the decreasing size of portable electronic devices, existing applications and corresponding user interfaces continue to include increasing amounts of information. In addition, increased processing power has allowed application developers to implement more complex functions. Although an end user may merely desire to perform a specific task, static user-interfaces that provide a myriad of options are typically provided. Moreover, existing applications do not update user interfaces to account for user behavior. Instead, existing user interfaces are not flexible and provide excessive data and functionality in static manners. As a result, user interfaces frequently appear too complex for many users who desire to complete tasks in a quick and intuitive manner.

Accordingly, there is a need to provide dynamic user interfaces, including user interfaces generated based on user behavior. Also, there is a need for systems and methods for self-learning dynamic user interfaces.

SUMMARY OF THE INVENTION

Accordingly, the present invention is directed to systems and methods for generating dynamic user interfaces that substantially obviate one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of embodiments of the present invention, as embodied and broadly described, the systems and methods for generating dynamic user interfaces include module(s) and/or step(s) for retrieving, at a backend UI server, one or more user requests originating from an information management application, retrieving, at the backend UI server, a data response originating from a data server in response to the one or more user requests, calculating, at the backend UI server, a relevance value for each display component of the information management application, appending the calculated relevance values to the data response, transmitting the calculated relevance values and the data response to a frontend UI server, and generating, at the frontend UI server, a user interface for the information management application based on the calculated relevance values.

It is to be understood that both the foregoing general description and the following detailed description provides examples that are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

FIG. 3 illustrates a representative view of an example information management display according to an example embodiment.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Embodiments of user interfaces and associated methods for using an electronic device are described. In some embodiments, the device is a portable communication device (e.g., a mobile phone or tablet). The user interface may include a touch screen and/or other input/output devices. In the discussion that follows, a portable communications device is used as an example embodiment. It should be understood, however, that the user interfaces and associated methods may be applied to other devices, such as personal computers, laptops, televisions, and gaming consoles, which may include one or more other physical user-interface devices, such as a keyboard, mouse, and/or touch-screen.

The portable communication device may support a variety of applications, such as telephone, text messenger, and information management applications. The various applications that may be executed on the device may use at least one common physical user-interface device, such as a touch screen. One or more functions of the touch screen as well as corresponding information displayed on the device may be adjusted and/or varied from one application to another and/or within a respective application. In this way, a common physical architecture of the device may support a variety of applications with user interfaces that are intuitive and transparent. In the discussion that follows, an information management application is used as an example embodiment, but it should be understood that the user interfaces and associated methods may be applied to other applications, such as entertainment applications, gaming applications, etc.

By implementing the dynamic interfaces according to embodiments of the present disclosure, users will be better equipped to access specific data and application functionality, and make more informed decision in real-time. The dynamic interfaces of the present disclosure avoid the problems associated with navigating through menus that are not utilized by a particular user. As a result, users may more efficiently retrieve data and execute desired tasks.

Figure 1:
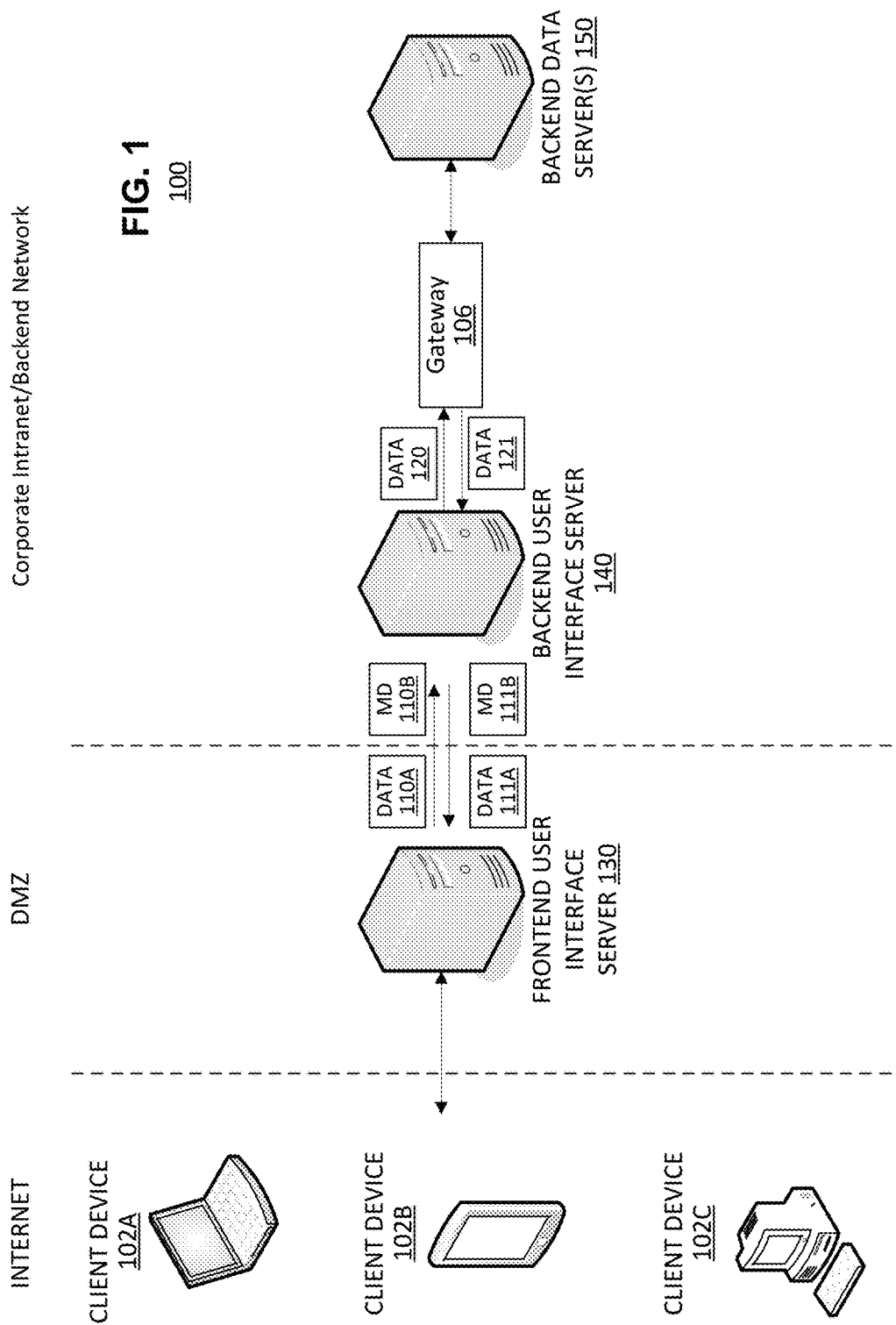
FIG. 1 is a system diagram depicting an architectural overview of a networked system for generating dynamic user interfaces according to an example embodiment.

FIG. 1 is a system diagram depicting an architectural overview of a networked system 100 for generating dynamic user interfaces according to an example embodiment. The system 100 includes client devices 102A, 102B, 102C, frontend UI (user interface) server 130, backend UI server 140, gateway 106, and backend data server(s) 150. Communications between components of the system 100 may utilize a variety of data transfer protocols, such as HTTP methods (e.g., get, post, put, and delete) or web socket, to query, interact, and manipulate data. In addition, the components of system 100 may be implemented using conventional and/or cloud networks.

As illustrated, the networked system 100 includes one or more client devices such as client devices 102A, 102B, 102C, being network accessible via an Internet connection, and connected to a frontend UI server 130 in a network demilitarized zone (DMZ). Collectively, devices such as client devices 102A, 102B, 102C and frontend UI server 130 may be referred to as a dynamic frontend system. Client devices 102A, 102B, 102C may include a variety of devices which may include, for example, a mobile device (e.g., mobile phone or a smartphone), a personal computer, a laptop, a tablet, or the like. Each of the client devices 102A, 102B, 102C is configured to transmit and receive data and metadata communications with the frontend UI server 130. The data communications (e.g., 110A and 120) may be exchanged with backend data server(s) 150, whereas metadata communications (e.g., 110B, 111B) may be exchanged with backend UI server 140.

The frontend UI server 130 may be configured to transmit data 110A to an enterprise data system such as a backend server 150 in a corporate intranet/backend network. The optional gateway 106 may translate requests, such as data retrieval requests included in data 110A, to other proprietary protocols, such as remote function call (RFC). Alternatively, the functions of gateway 106 may be implemented at backend server 150 such that it may directly receive requests. The backend server 150 may be configured to process the request(s), retrieve data and/or perform data operations as an appropriate response to a request, and return a response for transmission back to the gateway 106. Again, the gateway 106 may be used to translate a proprietary protocol. The data response 121 may be transmitted from gateway 106 (which is located in the backend network) to the appropriate client device 102A, 102B, 102C via backend and frontend user interface servers 140, 130.

Frontend UI server 130 may include a data handler adapted to retrieve data and/or metadata from the backend UI server 140. The metadata may include information about the type of the data (e.g., date, type of input field, read-only/editable, function, etc.) as well as information about the relevance of the data. Using relevance information, the frontend server 130 may instruct a client device 102 to generate and render user interfaces in a dynamic manner. For example, important data, functions, and input fields may be rendered on the more visible (prominent) location of the user interface (e.g., on the top or on the first section of the user interface). In another example, more important functions may be accessible via larger buttons. Conversely, less relevant data, functions, and/or optional input fields may be rendered in a less prominent portion of the user interfaces. For example, less important elements may be rendered below, or in a secondary tab (e.g., "further data or special functions"). In some instances, less relevant data may be hidden, thus reducing the perceived complexity of the user interface.

When using server-side UI technologies (e.g., Perl, SAP-WebDynpro, SAPGui, etc.), a frontend UI server 130 may generate the UI code at runtime. However, depending on the UI technology, some embodiments may implement the functions of the frontend UI server 130 on the client-side. For example, functions of the frontend UI server 130 may be implemented at the client device 102A, 102B, 102C on a browser using HTML5/javascript/css, or on a device using ObjectiveC. Thus, in some implementations, use of frontend server 130 is optional.

Backend UI server 140 may be located between the frontend UI server 130 and the gateway 106 to intercept data communications such as data 110, 120. The backend UI server 140 acts as a middle party with both client and server functionality to handle communications in both directions. The backend UI server 140 may perform server functions, such as responding to data requests from client devices 102A, 102B, 102C. Data responses may be included in data 111A. The backend UI server 140 also performs client functions, such as forwarding incoming data requests from the client device (102A, 102B, 102C) to the gateway 106 and the backend server 150. The backend UI server 140 may forward a data request 120 to the backend server 150, and receive a corresponding data response 121. The data response 121 may be relayed to the frontend UI server 130 as data 111A.

The backend UI server 140 may be adapted to transmit data 111A and metadata 111B to the frontend UI server 130. The backend UI server 140 may include a dynamic metadata manager that may apply one or more algorithms (e.g., heuristic, predictive, or others) to determine an appropriate user interface. A variety of algorithms, or a combination of different types of algorithms and logic, are feasible. For example, these algorithms may apply user-specific data (e.g., frequently used functions, often accessed data, etc.). In another example, these algorithms may leverage behavior of users of peer groups to train predictive algorithms (e.g., users selecting functions A and B, often select function C, but rarely function D), and may apply this group specific data to calculate the relevance of UI data and functions. In some instances, the algorithms may integrate business and information application logic in any combination.

Backend UI server 140 may store a variety of user information. For example, the dynamic metadata manager may track how frequently certain data or functions were accessed by a user or group of users. Selections through a touchscreen, mouse, or other input/output device may be tracked. In some instances, the client device 102 may include eye-tracking software that utilizes the device's integrated camera to ascertain which portions of the interface receive more user attention. By tracking user selections, data and functions that are ignored or seldom utilized by a user or group of users may be removed or designated to less prominent portions of the display.

In some instances, the frontend UI server 130 and backend UI server 140 may be co-deployed on the same physical system. Such an implementation may result in a reduced total cost of ownership. This physical system can reside before or behind a firewall (i.e., same or separate DMZ), depending on security needs. In the various embodiments, servers 130, 140 may be contemplated as logical servers, not as physical ones.

After receiving the data response 121 from the gateway server 106 (and correspondingly, from the backend server 150), the backend UI server 140 can append metadata 111B to received data 121. Once the data response 111A, 111B is generated by backend UI server 140, the data response 111A, 111B may be returned to the client device by frontend UI server 130. As shown, response data 111A and response metadata 111B may be communicated from the backend UI server 140 to the frontend UI server 130, for communication to the appropriate client device 102A, 102B, 102C.

Data relating to a group of users, such as peer groups, may relate to interactions with a single or multiple backend server(s) 150. Example groups may designate similarly situated users, such as employees of particular business units, managers, occasional consumers, business customers, etc. In another example, groups may be based upon the role of the user (e.g., sales rep, payroll admin, etc.). In some instances, user interface behavior of remote systems, such as social media and/or other nonbusiness systems may be tracked.

In some embodiments, unique identifiers for data and/or functions may be applied. Here, each identifier (and its corresponding data object or function) may be associated with a calculated relevance value. In the event that a user desires to return to a standardized interface, a reset-to-standard functionality, such as a "standard mode" interface button may be provided.

Figure 2:
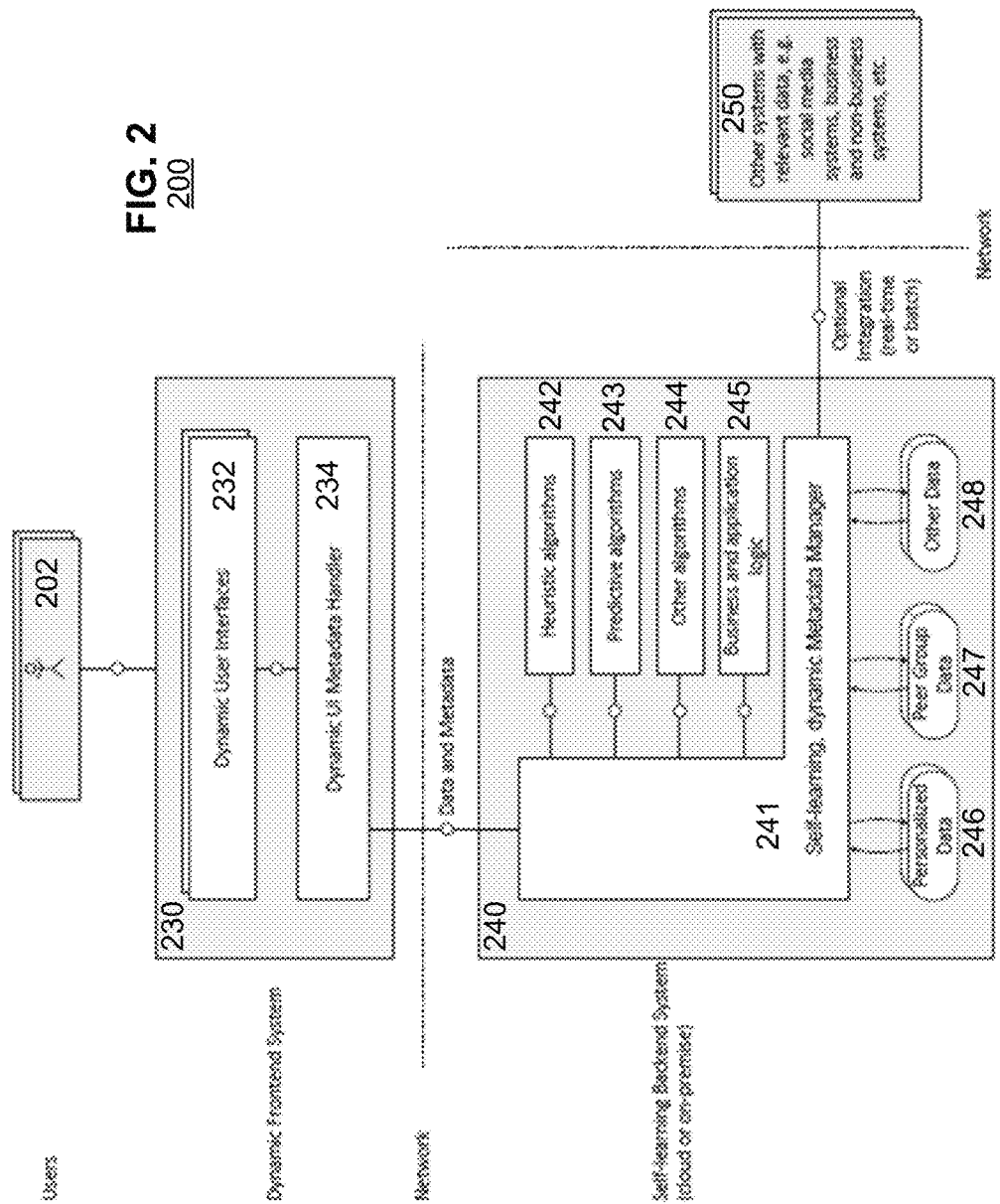
FIG. 2 is a block diagram showing components of a system for generating dynamic user interfaces according to an example embodiment.

FIG. 2 is a block diagram 200 showing components of a system for generating dynamic user interfaces according to an example embodiment. The block diagram includes client devices 202, frontend UI server 230, backend UI server 240, and backend data and application server(s) 250.

Frontend UI server 230 may include visualization modules 232 and metadata handler 234. Using metadata that is processed by metadata handler 234, visualization modules 232 generate and render dynamic user interfaces. The location of each element of the generated user interfaces may be based on its calculated relevance.

Visualization modules 232 may generate one or more pages of the information management application to be provided on a display of a host or directly in an Internet browser or a standalone application. Visualization modules 232 may employ client- and server-side UI technologies. More generally, the visualization modules 232 may be based on any document language (e.g., markup language) or other-type language for structuring and presenting content to the user. The document language may include HyperText Markup Language (HTML) (e.g., HTML5), but is not so limited.

The backend UI server 240 may include a dynamic metadata manager 241. The dynamic metadata manager 241 may apply one or more algorithms 242, 243, 244, 245 to a variety of user data 246, 247, 248. Algorithms include heuristic algorithms 242, predictive algorithms 243, others algorithms 244 (e.g., proprietary analytics), and business and/or application specific algorithms 245. The dynamic metadata manager 241 may analyze data relating to particular users 246, user groups 247, and/or other data 248.

In some embodiments, the algorithms 242, 243, 244, 245 of dynamic metadata manager 241 may compute one or more relevance values for each display object. For example, there may be two levels of relevance determination: on situational level (e.g., specific to the information display) and on a user level (e.g., person, group, etc.). Thus, the calculated relevance value(s) may be based on a multilevel relevance determination.

FIG. 3 illustrates a representative view of an example information management display according to an example embodiment. As shown in FIG. 3, the example information management display 300 includes multiple component sections, such as functions menu section 310, expanded functions button 311, relevant information display 320, related items section 330, and expanded view button 331. As alluded to above, however, the information management application and display may further introduce additional modules and/or components based on their calculated relevance.

Within functions menu 310, the user's most frequently used functions may be accessed by the user. If desired, additional functions may displayed by selecting expanded functions button 311. When the expanded functions button 311 is selected, less frequently used functions may be accessed by the user.

Most relevant information may be displayed in relevant information display 320. Similarly, related items having a slightly reduced calculated relevance may be displayed in related items sections 330. If desired, the user may view additional information by selecting the expanded view button 331.

The information management application may be linked or integrated with one or more applications, including e-mail, calendar, task, notes, file access, document storage and other applications. Each of the display sections may be fully integrated modules of the information management application, or may retrieve objects (e.g., e-mails, calendar entries, etc.) from one or more standalone applications.

Although an example display is illustrated, numerous user interfaces are feasible. Displays, with various configurations, may include different functions, function arrangements, information, related items, etc. In addition, the display may also include functions for collaboration with other applications (e.g., email, phone, SMS, social media integration), search, analytical charts, graphs, game high score, etc.

The component sections of the information management display 300 may be rearranged, resized, added and/or removed by a user to customize the display of the application. For example, a user may tap and hold on a desired component section and then drag the component section to move the selected screen to a new location on the display page. In another example, each component section may include a preferences menu. The preferences menu may be invoked by selecting a component section (e.g., right click or a double tap). The example preferences menu may include display configuration and format settings, additional information, options to delete the one or more portions of the display, and other options to modify or control the display. The order of these settings can vary based on the computed relevance.

Figure 4:
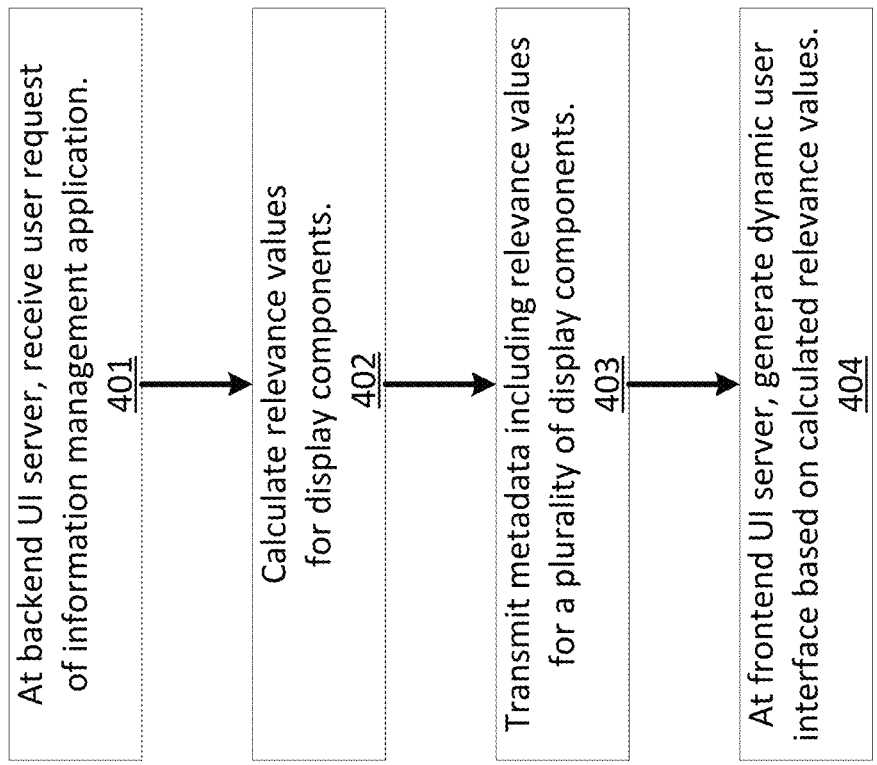
FIG. 4 illustrates a method for using the information management application according to an example embodiment.

FIG. 4 illustrates a method for using the information management application according to an example embodiment.

At step 401, the backend UI server receives one or more user requests originating from an information management application of a client device. After retrieving a data response from a backend data server, the backend UI server calculates the relevance values for a plurality of display components, at step 402.

At step 403, the backend UI server appends metadata that includes the calculated relevance values to the data response. Thus, the backend UI server may transmit both a data response and a metadata response to the frontend UI server.

Lastly, at step 404, the frontend UI server may generate a dynamic user interface based on calculated relevance values. Thus, a dynamic user interface may be rendered at the client device. Here, the number of display components may vary. Visualizations of dynamic display information may be rendered by a portable electronic client device based on locally stored information retrieved from the frontend UI server.

Figure 5:
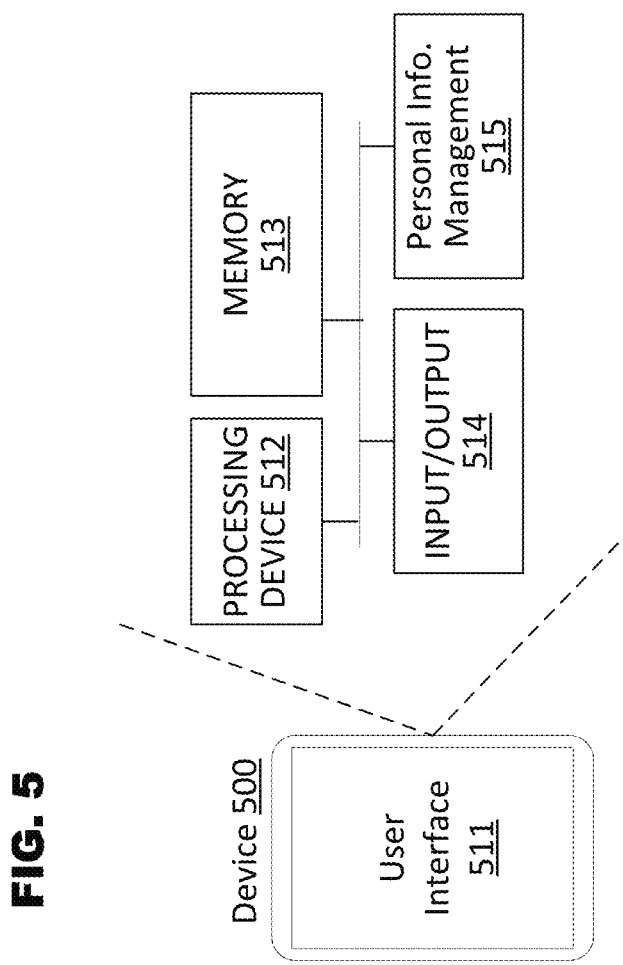
FIG. 5 illustrates a representative architecture of an electronic device according to an example embodiment.

FIG. 5 illustrates a representative architecture of an electronic device according to an example embodiment.

A portable electronic device or a similarly equipped desktop computer 500 may include a user interface 511, processing device 512, memory 513, and input/output module 514. The user interface 511 may include a display, which may be a touch screen, capable of displaying data to a user of the device 500. Device 500 may also include an information management application module 515 that generally implements the functionality of the information management application. The components and functions of the information management application module 515 are explained in detail with reference to FIGS. 1 and 2.

Although not shown, the touch screen may include a sensor that may be a capacitive touch detection sensor, configured to detect and track movement on the surface and/or in the vicinity of the display. The sensor may be coupled to a signal processing circuit that is configured to identify, locate, and/or track object movement based on the data obtained from sensor. The input/output module 514 manages the functionality of user interfaced 511. For example, input/output module 514 may include functionality for identifying a component section within the information management application. An alternate component section may be selected by touching the alternate component section. The same functionality can be achieved by mouse, track-point etc. for desktop or laptop devices.

Memory 513 may include a computer readable medium storing application modules, which may include instructions associated with applications and modules of the device 500.

The device may contain a processing device 512, memory 513, and a communications device (not shown), all of which may be interconnected via a system bus. In various embodiments, the device 500 may have an architecture with modular hardware and/or software systems that include additional and/or different systems communicating through one or more networks via one or more communications devices.

Communications devices may enable connectivity between the processing devices 512 in the device 500 and other systems by encoding data to be sent from the processing device 512 to another system over a network and decoding data received from another system over the network for the processing device 512.

In an embodiment, memory 513 may contain different components for retrieving, presenting, changing, and saving data and may include computer readable media. Memory 513 may include a variety of memory devices, for example, Dynamic Random Access Memory (DRAM), Static RAM (SRAM), flash memory, cache memory, and other memory devices. Memory 513 may be capable of storing user inputs and preferences as well as customized displays and templates.

Processing device 512 may perform computation and control functions of a system and comprises a suitable central processing unit (CPU). Processing device 512 may include a single integrated circuit, such as a microprocessing device, or may include any suitable number of integrated circuit devices and/or circuit boards working in cooperation to accomplish the functions of a processing device. Processing device 512 may execute computer programs, such as object-oriented computer programs, within memory 513.

The foregoing description has been presented for purposes of illustration and description. It is not exhaustive and does not limit embodiments of the disclosure to the precise forms disclosed. For example, although the processing device 512 is shown as separate from the modules 514 and 515 and the user interface 511, in some instances the processing device 512 and the user interface 511 and/or one or more of the modules 514 and 515 may be functionally integrated to perform their respective functions.

It will be apparent to those skilled in the art that various modifications and variations can be made in the systems and methods for generating dynamic user interfaces of the present disclosure without departing from the spirit or scope of the disclosure. Thus, it is intended that the present disclosure cover the modifications and variations of this disclosure provided they come within the scope of the appended claims and their equivalents.

I claim:

1. A method comprising:
retrieving, at a backend user interface server, one or more user requests originating from an information management application of a client device configured to transmit and receive metadata comprising information about a type of data and information about a relevance of the data;
retrieving, at the backend user interface server, a data response originating from a data server in response to the one or more user requests;
calculating, at the backend user interface server, a relevance value for each display component of the information management application of the client device using a multilevel relevance determination comprising a situational level and a user level, the relevance value based at least in part on tracking selections of display components by a user with an eye-tracking software and an integrated camera;
appending, at the backend user interface server, the metadata that includes the calculated relevance values to the data response;
transmitting, from the backend user interface server, the metadata including the calculated relevance values and the data response to a frontend user interface server; and
generating, at the frontend user interface server using the metadata processed by a metadata handler, a dynamic user interface for the information management application of the client device based on the calculated relevance values; and presenting, at the client device, display components of the information management application with higher relevance value at a more prominent location than display components with lower relevance value in the dynamic user interface.

2. The method according to claim 1, wherein the relevance values are calculated at the user level of the multilevel relevance determination for each user.

3. The method according to claim 1, wherein the relevance values are calculated at the user level of the multilevel relevance determination for each user group.

4. The method according to claim 1, wherein the relevance values are calculated at the situational level of the multilevel relevance determination based on the user request.

5. The method according to claim 1, wherein the relevance values are calculated at both the situational level and the user level of the multilevel relevance determination using predictive algorithms.

6. The method according to claim 1, wherein the data server is located within a different network than the backend and frontend UI servers.

7. The method of claim 1, further comprising translating user requests at a gateway located between the frontend UI server and the backend UI server.

8. The method of claim 1, wherein the generating comprises generating and rendering dynamic user interfaces by a visualization module of the frontend UI server using metadata processed by a metadata handler of the frontend UI server.

9. A non-transitory computer readable storage medium storing one or more programs configured to be executed by a processor, the one or more programs comprising instructions for:
   retrieving, at a backend user interface server, one or more user requests originating from an information management application of a client device configured to transmit and receive metadata comprising information about a type of data and information about a relevance of the data;
   retrieving, at the backend user interface server, a data response originating from a data server in response to the one or more user requests;
   calculating, at the backend user interface server, a relevance value for each display component of the information management application of the client device using a multilevel relevance determination comprising a situational level and a user level, the relevance value based at least in part on tracking selections of display components by a user with an eye-tracking software and an integrated camera;
   appending, at the backend user interface server, the metadata that includes the calculated relevance values to the data response;
   transmitting, from the backend user interface server, the metadata including the calculated relevance values and the data response to a frontend user interface server; and
   generating, at the frontend user interface server using the metadata processed by a metadata handler, a dynamic user interface for the information management application of the client device based on the calculated relevance values; and
   presenting, at the client device, display components of the information management application with higher relevance value at a more prominent location than display components with lower relevance value in the dynamic user interface.

10. The computer readable storage medium of claim 9, wherein the relevance values are calculated at the user level of the multilevel relevance determination for each user.

11. The computer readable storage medium of claim 9, wherein the relevance values are calculated at the user level of the multilevel relevance determination for each user group.

12. The computer readable storage medium of claim 9, wherein the relevance values are calculated at the situational level of the multilevel relevance determination based on the user request.

13. The computer readable storage medium of claim 9, wherein the relevance values are calculated at both the situational level and the user level of the multilevel relevance determination using predictive algorithms.

14. The computer readable storage medium of claim 9, wherein the data server is located within a different network than the backend and frontend UI servers.

15. A system comprising:
   one or more processors; and
   memory storing a plurality of integrated programs for execution by the one or more processors, one of the plurality of integrated programs including:
   retrieving, at a backend user interface server, one or more user requests originating from an information management application of a client device configured to transmit and receive metadata comprising information about a type of data and information about a relevance of the data;
   retrieving, at the backend user interface server, a data response originating from a data server in response to the one or more user requests;
   calculating, at the backend user interface server, a relevance value for each display component of the information management application of the client device using a multilevel relevance determination comprising a situational level and a user level, the relevance value based at least in part on tracking selections of display components by a user with an eye-tracking software and an integrated camera;
   appending, at the backend user interface server, the metadata that includes the calculated relevance values to the data response;
   transmitting, from the backend user interface server, the metadata including the calculated relevance values and the data response to a frontend user interface server;
   generating, at the frontend user interface server using the metadata processed by a metadata handler, a dynamic user interface for the information management application of the client device based on the calculated relevance values; and
   presenting, at the client device, display components of the information management application with higher relevance value at a more prominent location than display components with lower relevance value in the dynamic user interface.

16. The system of claim 15, wherein the relevance values are calculated at the user level of the multilevel relevance determination for each user.

17. The system of claim 15, wherein the relevance values are calculated at the user level of the multilevel relevance determination for each user group.

18. The system of claim 15, wherein the relevance values are calculated at the situational level of the multilevel relevance determination based on the user request.

19. The system of claim 15, wherein the relevance values are calculated at both the situational level and the user level of the multilevel relevance determination using predictive algorithms.

20. The system of claim 15, wherein the data server is located within a different network than the backend and frontend UI servers.

\* \* \* \* \*